(12) United States Patent
Bohner et al.

(10) Patent No.: US 6,269,903 B1
(45) Date of Patent: Aug. 7, 2001

(54) STEERING SYSTEM FOR A VEHICLE

(75) Inventors: Hubert Bohner, Boeblingen; Mathias Hartl, Kernen; Martin Moser, Fellbach; Wolfgang Schrock, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/396,409

(22) Filed: Sep. 15, 1999

(30) Foreign Application Priority Data

Sep. 15, 1998 (DE) .............................................. 198 42 066

(51) Int. Cl.⁷ ...................................................... B62D 5/06
(52) U.S. Cl. .......................... 180/406; 180/403; 180/405; 180/402
(58) Field of Search .................................. 180/402, 403, 180/404, 405, 406

(56) References Cited

U.S. PATENT DOCUMENTS

| 3,657,888 | * | 4/1972 | Zirps ..................... 60/52 S |
| 3,905,438 | * | 9/1975 | Runyon et al. ............ 180/79.2 |
| 3,958,420 | * | 5/1976 | Yokota ..................... 60/453 |
| 4,043,419 | * | 8/1977 | Larson et al. ............... 180/132 |
| 4,069,889 | * | 1/1978 | Yapp et al. ................ 180/132 |
| 4,410,057 | * | 10/1983 | Johnson .................. 180/133 |
| 4,535,678 | * | 8/1985 | Thomsen et al. ............. 91/29 |
| 4,553,390 | * | 11/1985 | Liebert et al. .............. 60/384 |
| 4,558,631 | * | 12/1985 | Fassbender ............... 91/516 |
| 4,955,445 | | 9/1990 | Kauss . |
| 5,022,481 | * | 6/1991 | Carter .................... 180/133 |
| 5,022,482 | * | 6/1991 | Andersson et al. .......... 180/133 |
| 5,249,639 | * | 10/1993 | Marr et al. ............... 180/133 |

FOREIGN PATENT DOCUMENTS

| 2308107 | 6/1997 | (GB) . |
| 10-203398 | 8/1998 | (JP) . |
| WO 97/39935 | 10/1997 | (WO) . |

* cited by examiner

*Primary Examiner*—Brian L. Johnson
*Assistant Examiner*—Daniel Yeagley
(74) *Attorney, Agent, or Firm*—Crowell & Moring, L.L.P.

(57) ABSTRACT

High functional reliability for a vehicle steering system that can be switched between a normal mode with a steer-by-wire level and an emergency mode with a fall-back level is achieved by providing that the fall-back level has a hydraulic system which contains a manual-side double-acting piston-cylinder unit which is actuated with a steering handle, e.g. steering wheel. The unit is positively coupled hydraulically to a wheel-side double-acting piston-cylinder unit which actuates steered vehicle wheels. A hydraulic charging system has a hydraulic pump, the inlet side of which is connected to a hydraulic-fluid reservoir. Switchable hydraulic couplings are provided for hydraulically coupling and decoupling the hydraulic system of the fall-back level and the hydraulic charging system to and from one another, respectively.

28 Claims, 2 Drawing Sheets

STEERING SYSTEM FOR A VEHICLE

BACKGROUND OF THE INVENTION

This application claims the priority of 198 42 066.8-21, filed Sep. 15, 1998, the disclosure of which is expressly incorporated by reference herein.

The present invention relates to a vehicle steering system that can be switched between a normal mode with a steer-by-wire level and an emergency mode with a fall-back level, and to methods for function-checking such a steering system.

In a known type of steering system, a steering handle, e.g. a steering wheel, is actuated by a driver. During normal operation of this steering system, i.e. on its steer-by-wire level, the steering handle is connected to steered vehicle wheels by an electric or electronic control system. Steering commands input into the steering system via the steering handle are converted into steering-angle adjustments of the steered vehicle wheels on the steer-by-wire level by the control system. In the emergency mode of the steering system, i.e. on its fall-back level, the steering handle is positively coupled, mechanically and/or hydraulically, to the steered vehicle wheels. On the fall-back level, a steering actuation of the steering handle is converted directly into a steering actuation of the steered vehicle wheels by the positive coupling.

SUMMARY OF THE INVENTION

An object of the present invention is to configure a steering system such that high functional reliability can be guaranteed.

According to the invention, this object has been achieved by a steering system for a vehicle, which can be switched between a normal mode with a steer-by-wire level and an emergency mode with a fall-back level, the fall-back level having a hydraulic system which contains a manual-side double-acting piston-cylinder unit which is actuated with a steering handle, e.g. steering wheel, and is positively coupled hydraulically to a wheel-side double-acting piston-cylinder unit which actuates steered vehicle wheels, a hydraulic charging system being provided that has a hydraulic pump, the inlet side of which is connected to a hydraulic-fluid reservoir, switchable hydraulic coupling means being provided by means of which the hydraulic system of the fall-back level and the hydraulic charging system can be coupled to one another and decoupled from one another hydraulically.

The invention is based on the general recognition of the advantages of providing the fall-back level for implementing the mechanical or hydraulic positive coupling with a hydraulic system and furthermore to equip the steering system with a hydraulic charging system. The two hydraulic systems communicate with one another or are decoupled from one another hydraulically in dependence on switchable hydraulic coupling means. This measure allows the hydraulic system of the fall-back level to be influenced in many different ways by the hydraulic charging system. For example, it can be used to vary the pressure of the hydraulic fluid in the hydraulic system of the fall-back level.

The quantity of hydraulic fluid in the hydraulic system of the fall-back level can be varied, making it possible, for example, to replace slight losses due to leaks in the hydraulic system of the fall-back level from the hydraulic charging system, which is equipped with a corresponding hydraulic-fluid reservoir. Moreover, the coupling proposed according to the invention allows various function tests to be carried out on the steering system.

An important aspect is that the function tests on the fall-back level are also carried out on its, steer-by-wire level during the normal operation of the steering system. This means that the ability of the steering system to function in an emergency can be ensured. If the steering system detects a defect on the fall-back level during normal operation, then measures appropriate to the extent of the fault can then be indicated. For example, the maximum achievable speed of the vehicle can be reduced and a warning given to the effect that the vehicle should be taken to a workshop without delay.

According to a particularly advantageous embodiment of the steering system according to the invention, the steer-by-wire level has a hydraulic system for actuating the steered vehicle wheels which additionally acts as a hydraulic charging system. A high-grade and high-performance hydraulic charging system is thus available.

The object underlying the invention is also achieved by novel function checking methods.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
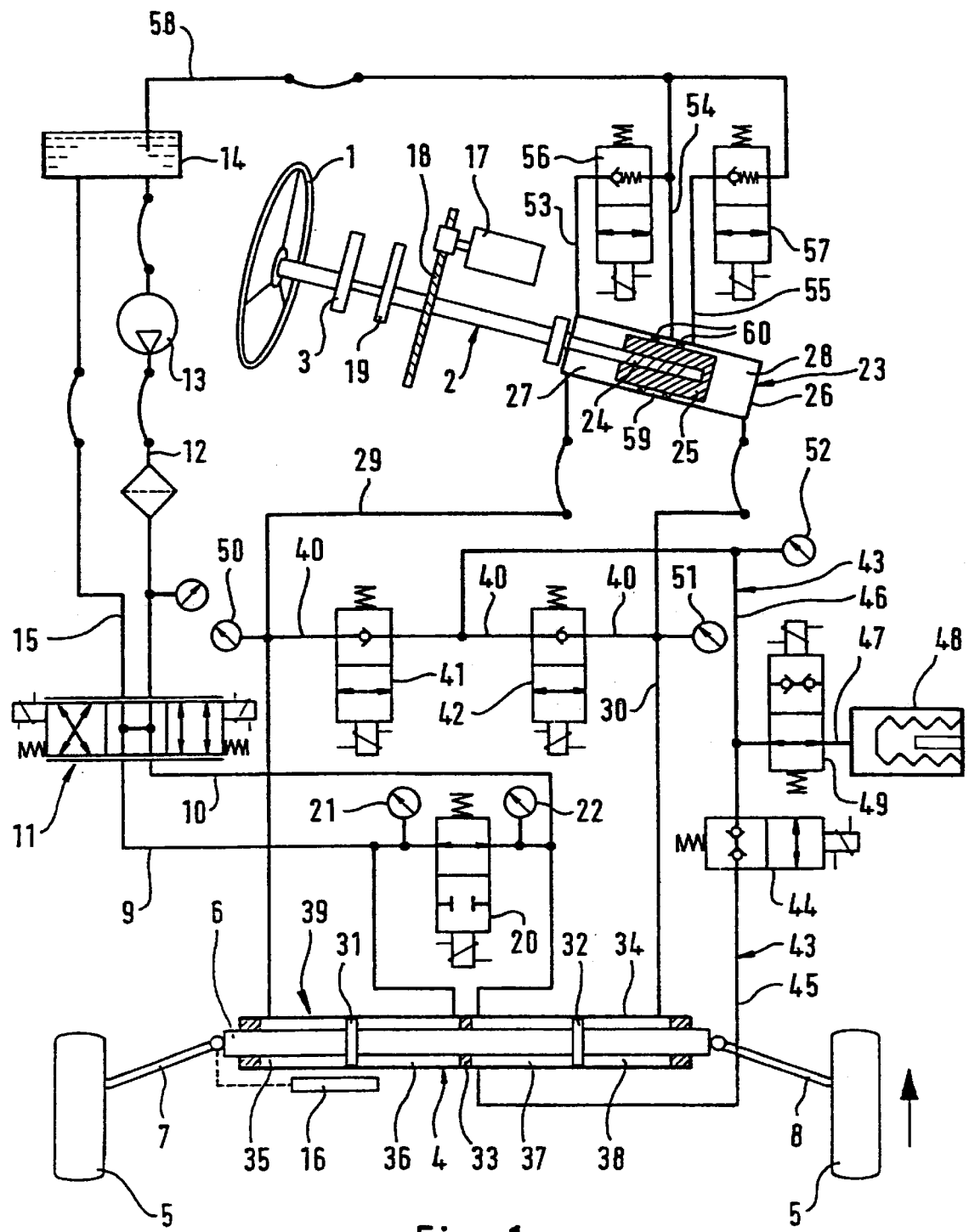
FIG. 1 is a schematic diagram of a first embodiment of the steering system according to the invention, in which a steer-by-wire level has a hydraulic servomotor.

According to FIG. 1, a steering system according to the invention has a driver-operated steering handle 1, which here is a steering wheel. The steering handle 1 is connected for rotation in common to a steering column 2 on which is arranged a desired steering-angle transmitter 3. This desired steering-angle transmitter 3 is part of the steer-by-wire level of the steering system and senses steering commands, input into the steering system by way of the steering handle 1, for the control system of the steer-by-wire level.

As a function of the desired steering-angle values, a conventional type of control unit can actuate a steering-angle actuator configured as a servomotor 4 which actuates steered vehicle wheels 5. The servomotor 4 is a double-acting piston-cylinder unit 4, the piston rod 6 of which is coupled to the steered vehicle wheels 5 by steering rods 7, 8.

An actual steering-angle transmitter 16 engages on the piston rod 6 and can be actuated together with the piston rod 6 and thus with the steered vehicle wheels 5.

The servomotor 4 is actuated by hydraulic connections 9, 10 connected to a control valve 11. The control valve 11 is a proportional control valve and can connect the hydraulic connections 9, 10 to a greater or lesser extent to a high-pressure line 12 connected to the delivery side of a hydraulic pump 13. The inlet side of the pump 13 is connected to a hydraulic-fluid reservoir 14, and to a low pressure line 15 connected to the hydraulic-fluid reservoir 14. The hydraulic pump 13 can be driven by the internal combustion engine of the vehicle fitted with the steering system or by an electric motor.

The steering system furthermore has a manual-torque actuator 17, which is here configured as an electric motor which engages at the steering column 2 on an actual manual-torque transmitter 19. Thereby, the manual torque currently being applied to the steering handle 1 can be detected.

The hydraulic connections 9, 10 can be connected to one another by a main safety valve 20. The main safety valve 20 adopts the position shown in FIG. 1 automatically when it is not energized for emergency operation. For normal operation, in contrast, the main safety valve 20 is switched into its other position, in which the hydraulic connections 9, 10 are hydraulically decoupled.

The steer-by-wire level of the steering system operates as follows:

In operation of the steer-by-wire level of the steering systems, the driver operates the steering handle 1, causing the desired steering-angle transmitter 3 to detect the steering requirement. A comparison between the desired and actual values for the steering angle is carried out in the control unit (not shown) and the control valve 11 is actuated as a function thereof. Depending on the direction of rotation of the steering handle 1, the servomotor 4 is then actuated in such a way that the piston rod 6 is moved to the left or the right, thereby adjusting the steered vehicle wheels 5 to the required extent.

In order to give the driver a feeling of the side forces prevailing at the steered vehicle wheels 5, these or the pressures associated with them are, for example, determined by pressure sensors 21 and 22 which communicate with the hydraulic connections 9, 10. A desired manual-torque value which is to be noticed by the driver at the steering handle 1 is generated in a corresponding control unit (not shown for the sake of clarity) as a function of the side forces determined. The electric motor or manual-torque actuator 17 is then controlled as a function of this desired manual-torque value. The steering torque transmitted by the electric motor 17 to the steering handle 1 is regulated in association with the actual manual-torque transmitter 19.

The fall-back level of the steering system has a piston-cylinder unit 23 on the manual side which is actuated by the steering column and thus by the steering handle 1. In this arrangement, the piston-cylinder unit 23 on the manual side is actuated by one axial end of the steering column 2, which is configured as a spindle drive 24 and interacts with a piston 25 of the piston-cylinder unit 23 on the manual side. A rotary actuation of the steering column 2 brings about an axial displacement of the piston 25 in a cylinder 26 of the piston-cylinder unit 23 on the manual side. In the cylinder 26, the piston 25 separates two chambers, a left-hand chamber 27 and a right-hand chamber 28. The left-hand chamber 27 is connected to a piston-cylinder unit 39 on the wheel side by a left-hand hydraulic line 29, and the right-hand chamber 28 is connected to the said wheelside piston-cylinder unit 39 by a right-hand hydraulic line 30.

In the embodiment illustrated, the wheel-side piston-cylinder unit 39 of the fall-back level and the servomotor 4 of the steer-by-wire level are integrated into the specially configured piston-cylinder unit. On its piston rod 6, this special piston-cylinder unit carries two axially spaced pistons 31, 32 and, between the pistons 31, 32, has a dividing wall 33 through which the piston rod 6 passes and which is mounted in a fixed location in a cylinder 34 of the piston-cylinder unit. Thereby, the pistons 31, 32 and the dividing wall 33 in the cylinder 34 separate four chambers 35, 36, 37 and 38 axially from one another. The axially outer chambers 35, 38 are assigned to the wheel-side piston-cylinder unit 39 of the fall-back level and, accordingly, communicate with the left-hand hydraulic line 29 and the right-hand hydraulic line 30, respectively. In contrast, the axially inner chambers 36, 37 are assigned to the servomotor 4 of the steer-by-wire level and communicate with the hydraulic connections 9, 10 respectively.

The hydraulic lines 29, 30 are both connected to a connecting line 40 in which a left-hand secondary safety valve 41 and a right-hand secondary safety valve 42 are arranged. In the position shown in FIG. 1, the secondary safety valves 41, 42 are each in their de-energized shut-off position, in which they operate in the manner of a non-return valve and allow flow in the direction of the respectively assigned hydraulic line 29 or 30 and prevent back flow in the opposite direction. In the other position, the secondary safety valves 41, 42 are open in both flow directions.

In emergency mode, the secondary safety valves 41, 42 assume the de-energized position shown in FIG. 1 and the communicating connection between the hydraulic lines 29, 30 is thus shut off. If the driver turns the steering handle 1, the piston 25 is displaced axially. In the process, hydraulic fluid is displaced from one of the chambers 27 or 28 and fed via the associated hydraulic line 29 or 30 into the associated chamber 35 or 38 of the piston-cylinder unit 39. There, the increase in the volume of the chamber 35 or 38 affected results in a corresponding displacement of the piston rod 6, with the result that the steered vehicle wheels 5 are adjusted as desired.

According to the invention, the hydraulic system of the fall-back level is connected hydraulically to the hydraulic system of the steer-by-wire level. In the embodiment shown in FIG. 1, this is achieved by connecting one end of a charging line 43 to the chamber 37 of the servomotor 4 and the other end to the connecting line 40 between the secondary safety valves 41, 42. A charging valve 44 is arranged in the charging line 43 to open or shut off the charging line 43 and to divide it into a lower section 45 and an upper section 46.

The point at which the charging line 43 is connected to the hydraulic system of the steer-by-wire level is in principle arbitrary. In the embodiment shown, this connection point is arranged at a geodetically low-lying point in the hydraulic system in order to avoid the entry of air into the hydraulic system of the fall-back level even in the event of a lack of oil in the hydraulic system of the steer-by-wire level. It is expedient, however, to avoid arranging this connection point at the lowest point in the hydraulic system in order to prevent dirt from entering the hydraulic system of the fall-back level as dirt tends to collect at the geodetically lowest point in the hydraulic system.

An accumulator 48 is connected to the upper section 46 of the charging line 43 by a connection line 47. The connection line 47 contains a monitoring valve 49 which opens or shuts off the connection line 47. The accumulator 48 can be used to store hydraulic fluid under pressure, and this can be fed to the hydraulic system of the fall-back level when required. The accumulator 48 can, if required, be charged by way of the hydraulic system of the steer-by-wire level. For this purpose, the charging valve 44 and the monitoring valve 49 are opened, establishing a communicating connection between the accumulator 48 and the chamber 37. In the appropriate position of the control valve 11, the accumulator 48 can then be supplied with hydraulic fluid. The working pressure in the hydraulic system of the fall-back level can be considerably lower than the working pressure of the hydraulic system of the steer-by-wire level. To enable charging to be controlled more effectively, the charging valve 44 can be configured as a proportional control valve or have an open position which permits only restricted flow of hydraulic fluid.

The arrangement of the secondary safety valves 41, 42 and of the charging valve 44 divides the hydraulic system of the fall-back level into a plurality of sections that can be decoupled from one another, namely into a so-called "left-hand hydraulic rod" including the left-hand hydraulic line 29 and the chambers 27, 35 connected thereto, a so-called "right-hand hydraulic rod" including the right-hand hydraulic line 30 and the chambers 28, 38 connected thereto, and the upper section 46 of the charging line 43 including the accumulator 48 that can be coupled thereto and decoupled therefrom. This measure allows, for example, the individual sections to be checked separately for leaktightness in the new-described manner.

Each of the abovementioned sections is assigned a pressure sensor 50, 51 and 52. In the sections, which are decoupled from one another by virtue of the closed position of the valves 41, 42 and 44, the pressure sensors 50, 51 and 52 can then be used to monitor whether there is a pressure drop in the sections. A pressure drop indicates a leak. To check the leaktightness of the upper section 46, the monitoring valve 49 is expediently shut off beforehand because otherwise any leak that is present will not result in any measurable pressure drop due to the slow discharge of the accumulator 48 and therefore cannot be detected.

As the working pressure of the hydraulic system of the fall-back level is comparatively low, a relatively long time is required for any pressure drop to be sensed if the leak is relatively small, with the result that long measuring times are required for reliable results. To increase the reliability of leaktightness checking, the hydraulic system of the fall-back level is therefore charged with a test pressure that is significantly higher than the usual working pressure before a leaktightness check.

For this checking purpose, the accumulator 48 is first decoupled from the remainder of the hydraulic system of the fall-back level by closing the monitoring valve 49 to allow the working pressure provided for the fall-back level to be made available rapidly in an emergency. The charging valve 44 is then opened to communicate the hydraulic systems of the fall-back level and the steer-by-wire level with one another. By appropriate activation of the control valve 11, a high pressure can then be introduced into the hydraulic system of the fall-back level. Once the desired test pressure has been reached in the hydraulic system of the fall-back level, the charging valve 44 is closed.

For the pressurization of the sections of the hydraulic system of the fall-back level, it is not important whether the secondary safety valves 41, 42 are in their open position or their closed position because, as described above, these valves operate as non-return valves in their closed position and therefore allow pressurization of the hydraulic lines 29, 30. Once the hydraulic system of the fall-back level or its sections have been charged to the test-pressure level, the pressure sensors 50, 51 and 52 can determine relatively rapidly whether there are any leaks.

As an alternative or in addition to leaktightness testing, the switching function of the valve 41, 42, 44 and 49 can be tested as follows. The abovementioned sections of the hydraulic system of the fall-back level are hydraulically decoupled by the corresponding shut-off positions of valves 41, 42 and 44. It is of no importance whether the hydraulic system of the fall-back level has been charged to the test pressure beforehand or whether the working pressure continues to prevail therewithin. What was said about checking leaktightness, however also applies here, namely that pressure drops can be detected more rapidly at a higher pressure level.

According to a preferred test routine, the three valves 41, 42 and 44 are tested in succession by a series of tests. At the beginning of the test, i.e. in particular after the charging of the sections to the test pressure, the valves 41, 42 and 44 are in their closed position. The control valve 11 is switched to the H position shown in FIG. 1, in which all the connections are connected to the reservoir 14. Accordingly, the pressure prevailing in the lower section 45 of the charging line 43 is the pressure level in the reservoir, i.e. the ambient atmospheric pressure. This pressure can be read, for example, off at the pressure sensor 22. In this way, a pressure difference is built up between the connections of the charging valve 44 because the upper section 46 of the charging line 43 is at at least the working pressure level, and preferably indeed at the test pressure level.

If the charging valve 44 is switching properly, a pressure drop must then be observed at the pressure sensor 52 when the charging valve 44 is open because a pressure equalization takes place. Owing to this pressure equalization, the abovementioned pressure difference is now applied to both secondary safety valves 41, 42. Opening one secondary safety valve 41 must cause the pressure sensor 50 to indicate a pressure drop if the secondary safety valve 41 is switching properly. The same applies to the opening of the other secondary safety-valve 42, in which case pressure sensor 51 must indicate a pressure drop.

The steering-system configuration according to the invention can also be used to check whether there is gas in the hydraulic system of the fall-back level in the following manner.

In a steering system which has a variable steering ratio on its steer-by-wire level, a particular steering angle at the steering handle is assigned a steering angle at the steered vehicle wheels 5 that can depend on various operating parameters, such as the vehicle speed. As a consequence, a particular steering actuation of the steering handle 1 by the steer-by-wire level is assigned a different steering adjustment of the steered vehicle wheels 5 or a different axial displacement of the piston rod 6 than via the fall-back level. Because the steered vehicle wheels 5 are coupled positively to the steering handle 1 via the fall-back level, however the servo-assisted displacement of the piston rod 6 on the steer-by-wire level would lead to an extreme pressure rise in one of the hydraulic rods 29, 27, 35 or 30, 28, 38. To prevent this, the secondary safety valves 41, 42 are open in normal operation, i.e. on the steer-by-wire level, ensuring that there is a continuous pressure equalization between the left-hand hydraulic rod 29, 27, 35 and the right-hand hydraulic rod 30, 28, 38 of the hydraulic system of the fall-back level.

In a steering system of this kind, which has a variable steering-angle ratio on the steer-by-wire level, the gas content of the hydraulic system of the fall-back level can be tested in a particularly simple manner. This is because the gas contained in the overall volume of hydraulic fluid in the hydraulic system changes the compressibility of this fluid. As a result, the piston rod 6 and hence also the piston 25 execute different axial displacements depending on the gas content until, with the secondary safety valves 41, 42 shut off for test purposes, a predetermined pressure difference has built up between the left-hand and the right-hand hydraulic rod 29, 27, 35 and 30, 28, 38, respectively of the hydraulic system of the fall-back level. This gas-content test can therefore be carried out in normal operation during a steering actuation. For this purpose, the secondary safety valves 41, 42 are briefly shut off in order to measure displacement of the piston rod 6 and/or the piston 25 at which the predetermined pressure difference has built up.

The gas content in the hydraulic system of the fall-back level can also be determined by first once again shutting off the secondary safety valves 41, 42 and then operating the electric motor 17 which turns the steering column 2, leading to an axial displacement of the piston 25 of the manual-side piston-cylinder unit 23. At the same time, however, the control valve 11 is switched such that by way of the corresponding control unit a counterpressure is built up in the wheel-side piston-cylinder unit 39 so that the piston rod 6 is not displaced. In this way, a differential pressure is built up between the left-hand hydraulic rod 29, 27, 35 and the right-hand hydraulic rod 30, 28, 38. Here too, the axial displacement of the piston 25 that is required to build up a predetermined differential pressure between the left-hand and the right-hand hydraulic rod is a measure of the gas content of the hydraulic system of the fall-back level.

It is clear that function tests which, like the gas-content test just described, represent a massive intervention in the steering system should preferably not be carried out while the vehicle is being driven. Instead, such tests can be carried out while the vehicle is stationary, e.g. as part of a service. This or another function test can also be carried out as part of a starting process, even before the starting of an internal combustion engine of a vehicle fitted with the steering system according to the invention.

Moreover, the switching of the valves can also be checked, for example, when no steering actuation of the steered vehicle wheels 5 is expected for a sufficiently long time, e.g., during straight-ahead travel. This time can be short in absolute terms because the charging of the hydraulic system of the fall-back level, the switching of the valves to be checked and the pressure measurements can be carried out within milliseconds.

At regular intervals, but at least when an impermissibly high gas content in the hydraulic system of the fall-back level has been detected, the hydraulic system of the fall-back plane is degassed or bled. For this purpose, bleed lines 53, 54 and 55 are fitted at the geodetically highest points in the hydraulic system. In the embodiment example shown, bleed line 53 is. connected to the left-hand chamber 27 and bleed line 55 to the right-hand chamber 28 of the manual-side piston-cylinder unit 23. Both bleed lines 53, 55 are connected by way of a respective bleed valve 56, 57 to a drain line 58 which opens into the hydraulic-fluid reservoir 14. The chambers 27, 28 of the manual-side piston-cylinder unit 23 can be bled by operating the bleed valves 56, 57 because there is a positive pressure in the hydraulic system of the fall-back level relative to the pressure level in the hydraulic-fluid reservoir 14.

In contrast, bleed line 54 is connected without the interposition of a bleed valve, i.e. directly, to an annular space 59 formed in the cylinder 26 of the manual-side piston-cylinder unit 23 between two axially spaced radial seals 60. The radial seals 60 are secured in the cylinder 26 and rest in a radially sealing manner against the piston 25. The arrangement of the axially spaced seals 60 ensures that, if one of the seals 60 leaks, the leaking fluid flows through the bleed line 54, thus causing a detectable pressure drop in the respectively associated hydraulic rod.

Forming different sections in the hydraulic system also makes it possible to check the functioning of the pressure sensors assigned to these sections as follows. If the hydraulic connections 9, 10 are hydraulically coupled by the position of the main safety valve 20 illustrated in FIG. 1, the pressure sensors 21, 22 must supply the same pressure value. Different measured values indicate zero drift or other sensor faults. The checking of the pressure sensors is therefore based on the principle of a plausibility check on redundant measured values.

Pressure sensors 52, 22 must likewise show the same pressure value when the upper section 46 and the lower section 45 of the charging line 43 are hydraulically coupled by the open position of the charging valve 44 because the hydraulic connection 10 with which the pressure sensor 22 communicates via the chamber 37 with the lower section 45 of the charging line. When the secondary safety valve 41 (or 42) is in its open position, the pressure sensor 50 or 51 must indicate the same pressure as the pressure measuring device 52 because the hydraulic line 29 or 30 is then hydraulically coupled to the upper section 46 of the charging line 43.

Selection of the pressure sensors compared with one another not only allows detection of the fact that one of the pressure sensors checked is defective but also, by carrying out appropriate checking measurements, detection of which pressure sensor is operating incorrectly.

Figure 2:
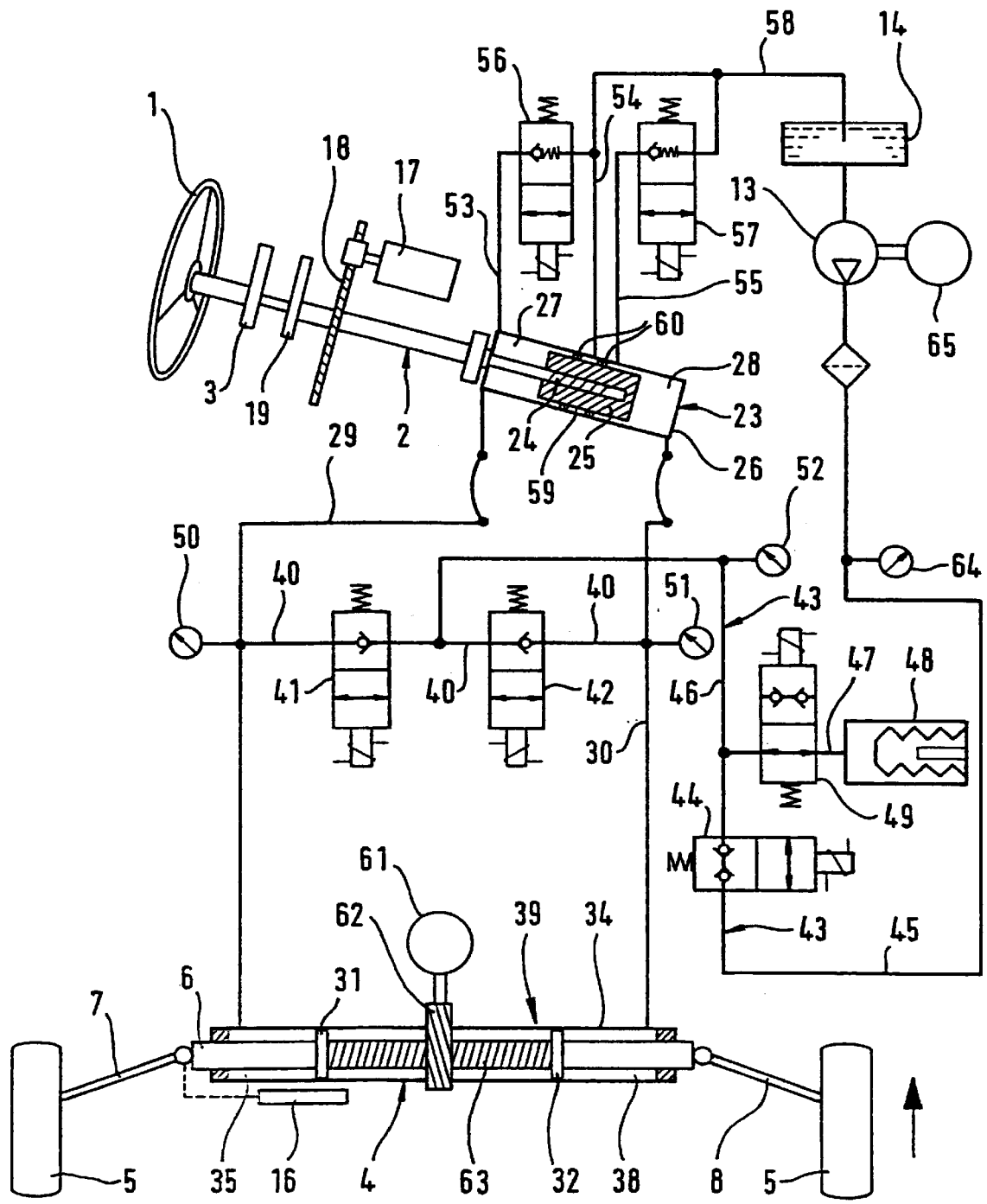
FIG. 2 is a schematic diagram of a second embodiment of the steering system according to the invention, in which a steer-by-wire level has an electric servomotor.

Whereas, in FIG. 1, in accordance with the embodiment shown there, the steer-by-wire level has the hydraulically operating servomotor 4, FIG. 2 shows an embodiment in which the steer-by-wire level has an electric servomotor 4. This electrically operating servomotor 4 has an electric motor 61 driving a pinion 62 meshing with a rack 63. The rack 63 is formed by that section of the piston rod 6 which is situated between pistons 31, 32.

In this second embodiment, a hydraulic charging system is provided for the purpose of charging the hydraulic system of the fall-back level, this system containing the hydraulic pump 13 and the hydraulic-fluid reservoir 14. The lower section 45 of the charging line is connected to the delivery side of the hydraulic pump 13. A pressure sensor 64 is arranged in the lower section 45 of the charging line for the purpose of monitoring the charging pressure. Otherwise, all the reference numerals correspond to those for the embodiment in FIG. 1, and the description of the embodiment in FIG. 1 is largely applicable to the embodiment example shown in FIG. 2.

According to FIG. 2, the hydraulic pump 13 of the hydraulic charging system is driven by an electric motor 65. The hydraulic pump 13 can, however, be coupled to the internal combustion engine by a mechanical drive line. Instead of a separate hydraulic pump 13 for the hydraulic charging system, the hydraulic pump of another hydraulic system that is already present in the vehicle can be used, for example the oil pump for oil lubrication of the internal combustion engine or the hydraulic pump of an ABS system, for charging the hydraulic system of the fall-back level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, a switchable hydraulic coupling for selectively coupling decoupling hydraulically the fall-back level hydraulic system and a steer by wire hydraulic system to the hydraulic charging system, and a boost-hydraulic system for changing the fall-back level to a working pressure greater than a pressure in the hydraulic-fuel reservoir.

2. The vehicle steering system according to claim 1, wherein the steer-by-wire level has a hydraulic system including a double-acting piston-cylinder unit for actuating the steered vehicle wheels and actuatable as a function of the actuation of the steering handle by an electric or electronic control system, the steer-by-wire level hydraulic system comprising the hydraulic charging system, the switchable hydraulic coupling being configured to allow the fall-back level hydraulic system and the steer-by-wire level hydraulic system to be coupled to and decoupled from one another hydraulically.

3. The vehicle steering system according to claim 2, wherein in the steer-by-wire level double-acting piston-cylinder unit and the fall-back level of the wheel-side double-acting piston-cylinder unit are arranged in a single piston-cylinder unit having two axially separate pistons engaging a common piston rod, a dividing wall through which the piston rod passes and which is fixed in relation to a cylinder arranged between the pistons, the pistons and the dividing wall forming in the cylinder axially separated chambers, of which axially outer chambers are assigned to the wheel-side double-acting piston-cylinder unit, and two axially inner chambers are assigned to the piston-cylinder unit of the steer by wire level.

4. The vehicle steering system according to claim 1, characterized in that the hydraulic coupling comprise a charging line for connecting the fall-back level hydraulic system to the hydraulic charging system or the steer-by-wire level hydraulic system and a charging valve arranged to open or shut off a hydraulic connection between the fall-back level and the steer-by-wire level.

5. The vehicle steering system according to claim 4, wherein the steer-by-wire level has a hydraulic system including a double-acting piston-cylinder unit for actuating the steered vehicle wheels and actuatable as a function of the actuation of the steering handle by an electric or electronic control system, the steer-by-wire level hydraulic system comprising the hydraulic charging system, the switchable hydraulic coupling being configured to allow the fall-back level hydraulic system and the steer-by-wire level hydraulic system to be coupled to and decoupled from one another hydraulically.

6. The vehicle steering system according to claim 4, wherein the charging line is operatively connected with an accumulator configured to store hydraulic fluid under pressure.

7. The vehicle steering system according to claim 6, wherein a monitoring valve is operatively arranged in a connection line for operatively connecting the accumulator to the charging line and selectively shuts off or opens a connection between the accumulator and the charging line.

8. The vehicle steering system according to claim 1, wherein the manual-side piston-cylinder unit comprises two chambers positively coupled hydraulically by a left-hand hydraulic line and a right-hand hydraulic line to associated chambers of the wheel-side double-acting piston-cylinder unit.

9. The vehicle steering system according to claim 8, wherein the left-hand hydraulic line operatively communicates via a connecting line configured to be shut off with the right-hand hydraulic line, with the charging line being operatively connected to the connecting line.

10. The vehicle steering system according to claim 9, wherein a respective safety valve or valves are arranged in the connecting line between the charging line and the hydraulic lines to selectively open and shut off the connection between the connecting line and the associated hydraulic lines.

11. The vehicle steering system according to claim 10, wherein in a shut-off position of the safety valve constitutes a non-return valve operational state and allows flow from the charging line to the associated hydraulic line and blocks back flow from the associated hydraulic line to the charging line.

12. The vehicle steering system according to claim 9, wherein the fall-back level hydraulic system comprises a bleed facility operatively connected to a hydraulic-fluid reservoir.

13. The vehicle steering system according to claim 12, wherein the bleed facility has bleed lines, each of which operatively communicates with one of the chambers of the manual-side piston-cylinder unit and each of which contains a bleed valve configured to selectively open and shut off the associated bleed line.

14. The vehicle steering system according to claim 13, wherein the bleed facility has a bleed line operatively communicating with an annular space formed in a cylinder of the manual piston-cylinder unit between two axially spaced radial seals of the cylinder for a piston.

15. The vehicle steering system according to claim 1, wherein the fall-back level hydraulic system comprises a bleed facility operatively connected to a hydraulic-fluid reservoir.

16. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle, and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system, comprising using at least one pressure sensor which operatively communicates with the fall-back level hydraulic system to check whether a pressure drop is taking place in the fall-back level hydraulic system and to test the leaktightness of the hydraulic system of the fall-back level, and hydraulically decoupling the fall-back level hydraulic system from the steer-by-wire level hydraulic system with appropriate switching of the switchable hydraulic coupling.

17. The method according to claim 16, wherein the function checks on the fall-back level hydraulic system occur during a predetermined operating range of a non-emergency steering system operation.

18. The method according to claim 17, wherein a stationary vehicle state is used as the operating range, and the respective function check are carried out as part of a service or as part of a starting operation of an internal combustion engine of a vehicle fitted with the steering system.

19. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system, wherein the manual-side piston-cylinder unit comprises two chambers positively coupled hydraulically by a left-hand hydraulic line and a right-hand hydraulic line to associated chambers of the wheel-side double-acting piston-cylinder unit, wherein the left-hand hydraulic line operatively communicates via a connecting line configured to be shut off with the right-hand hydraulic line, with a charging line being operatively connected to the connecting line, wherein a respective safety valve is arranged in the connecting line between the charging line and the hydraulic lines to selectively open and shut off the connection between the connecting line and the associated hydraulic line, comprising forming hydraulically decoupled sections by shut-off positions of the safety valves and of the charging valve in the fall-back level hydraulic system, and assigning to each of the sections a pressure sensor for checking pressure drops in the respectively assigned section to test the leaktightness of individual sections of the hydraulic system of the fall-back level.

20. The method according to claim 19, wherein at the beginning of the testing for leaktightness of the fall-back level hydraulic system or individual sections thereof, or at the beginning of the testing of the switching of the valves of the fall-back level hydraulic system, the fall-back level hydraulic system is subjected to positive pressure via the steer-by-wire level hydraulic system.

21. The method according to claim 20, wherein for function checking the vehicle steering system before subjecting the fall-back level hydraulic system to positive pressure, a monitoring valve assigned to an accumulator on the charging line is switched to a shut-off position thereof.

22. A method according to claim 20, wherein for function checking the vehicle steering system, before subjecting the fall-back level hydraulic system to positive pressure, the safety valves are switched to a closed position thereof to operate as a non-return valve.

23. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system, wherein the manual-side piston-cylinder unit comprises two chambers positively coupled hydraulically by a left-hand hydraulic line and a right-hand hydraulic line to associated chambers of the wheel-side piston-cylinder unit, the left-hand hydraulic line operatively communicates via a connecting line configured to be shut off with the right-hand hydraulic line, with a charging line being operatively connected to the connecting line, and a respective safety valve is arranged in the connecting line between the charging line and the hydraulic lines to selectively open and shut off the connection between the connecting line and the associated hydraulic line, to test the gas content of the hydraulic system of the fall-back level in the case of a steer-by-wire level which has a variable steering ratio between the steering-angle actuation of the steering handle and the steering-angle actuation of the steered vehicle wheels, comprising closing the safety valves during an actuation of the steer-by-wire level of the wheel-side piston-cylinder unit and of the fall-back level wheel-side piston-cylinder unit and positively coupling said units directly or indirectly thereto; building up a differential pressure between the left-hand hydraulic line and the right-hand hydraulic line; and using the differential pressure to determine compressibility of the hydraulic fluid and thus to determine the gas content of the fall-back level hydraulic system.

24. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system, wherein the manual-side piston-cylinder unit comprises two chambers positively coupled hydraulically by a left-hand hydraulic line and a right-hand hydraulic line to associated chambers of the wheel-side piston-cylinder unit, the left-hand hydraulic line operatively communicates via a connecting line configured to be shut off with the right-hand hydraulic line, with a charging line being operatively connected to the connecting line, and a respective safety valve is arranged in the connecting line between the charging line and the hydraulic lines to selectively open and shut off the connection between the connecting line and the associated hydraulic line to test the gas content fall-back level hydraulic system if a steer-by-wire level which has a variable steering ratio between the steering-angle actuation of the steering handle and the steering-angle actuation of the steered vehicle wheels, comprising closing the safety valves; actuating a manual-torque actuator which is coupled to and simulates at the steering handle the manual torque corresponding to side forces acting at the steered vehicle wheels to actuate the manual-side piston-cylinder unit; actuating a control valve of the steer-by-wire level hydraulic system such that the wheel-side piston-cylinder unit does not adjust the steering angle at the steered vehicle wheels; and building up a differential pressure between the left-hand hydraulic line and the right-hand hydraulic line to determine compressibility of the hydraulic fluid and gas content of the fall-back level hydraulic system.

25. The method according to claim 24 wherein to degasify the fall-back level hydraulic system, at least one of the bleed valves is opened for a sufficient time.

26. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system, wherein the manual-side piston-cylinder unit comprises two chambers positively coupled hydraulically by a left-hand hydraulic line and a right-hand hydraulic line to associated chambers of the wheel-side piston-cylinder unit, wherein the left-hand hydraulic line operatively communicates via a connecting line configured to be shut off with the right-hand hydraulic line, with a charging line being operatively connected to the connecting line, wherein a respective safety valve or valves are arranged in the connecting line between the charging line and the hydraulic lines to selectively open and shut off the connection between the connecting line and the associated hydraulic line comprising conducting a plausibility check for checking equality of the safety values determined by a plurality of pressure sensors assigned to the sections wherein a plurality of the sections are coupled hydraulically to test the operation of pressure sensors assigned to individual sections of the hydraulic systems.

27. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulic-fluid reservoir, and a switchable hydraulic coupling for selectively coupling and decoupling hydraulically the fall-back level hydraulic system and the hydraulic charging system comprising test switching of at least one of a respective valve or valves of said switchable hydraulic coupling, switching the respective valve to a shut-off position thereof, forming a pressure difference in sections of the fall-back level hydraulic system which adjoin the respective valve, switching the respective valve into an open position thereof, assigning a pressure sensor to at least one of the sections of the fall-back level hydraulic system which adjoin the respective valve and, as a function of a pressure change sensed by the pressure sensor, making a check as to whether the respective valve has not switched.

28. A method for function checking a steering system switchable between a normal mode with a steer-by-wire level and an emergency mode with a fall-back level, the fall-back level comprising a hydraulic system which includes a manual-side double-acting piston-cylinder unit actuatable with a steering handle and positively coupled hydraulically to a wheel-side double-acting piston-cylinder unit configured to actuate steered vehicle wheels, a hydraulic charging system having a hydraulic pump with an inlet side operatively connected to a hydraulicfluid reservoir, and a switchable hydraulic coupling for selectively coupling and decoupling hydraulically the fall-back level hydraulic system and the hydraulic charging system, wherein the manual-side piston-cylinder unit comprises two chambers positively coupled hydraulically by a left-hand hydraulic line and a right-hand hydraulic line to associated chambers of the wheel-side piston-cylinder unit, the left-hand hydraulic line operatively communicates via a connecting line configured to be shut off with the right-hand hydraulic line, with a charging line being operatively connected to the connecting line, and a respective safety valve or valves are arranged in the connecting line between the charging line and the hydraulic lines to selectively open and shut off the connection between the connecting line and the associated hydraulic line, comprising, test switching of the valves, switching a charging valve and the safety valves to a shut-off position thereof; setting in a section of the charging line which adjoins the charging valve and is operatively coupled to the steer-by-wire level hydraulic system, a pressure different from pressure in the other sections of the fall-back level hydraulic system which are connected to the charging valve and thereby forming a pressure difference between the sections adjoining the charging valve; switching that the charging valve to open and, if the charging valve opens effecting a pressure equalization which can be sensed between the sections adjoining the charging valve and forming a pressure difference between the sections adjoining the safety valves; switching one of the safety valves to open and, if the one safety valve opens, effecting a pressure equalization which can be sensed between the sections adjoining the one safety valve, and switching another safety valve to open and, if the other safety valve opens effecting a pressure equalization which can be sensed between the sections adjoining the other safety valve.

\* \* \* \* \*